Aug. 1, 1933.　　　　D. FINLEY　　　　1,920,932
PIPE WRAPPING MACHINE
Filed May 30, 1930　　　2 Sheets-Sheet 1

INVENTOR
DOZIER FINLEY
BY Charles S. Evans
HIS ATTORNEY

Patented Aug. 1, 1933

1,920,932

UNITED STATES PATENT OFFICE 1,920,932

PIPE WRAPPING MACHINE

Dozier Finley, Berkeley, Calif., assignor to The Paraffine Companies, Inc., San Francisco, Calif., a Corporation of Delaware Application May 30, 1930. Serial No. 457,601

11 Claims. (Cl. 242—11)

My invention relates to a pipe wrapping machine, and particularly to a machine for wrapping installed pipe lines.

It is among the objects of the invention to provide a machine which will quickly and economically apply a protective covering to an installed pipe line.

Another object of the invention is the provision of a pipe wrapping machine by which a fixed pipe is given a protective covering; including means for applying an adhesive and waterproof fluid to the pipe, and wrapping to hold the latter in place and seal the pipe with an impervious covering that is water and decay-proof.

Another object of the invention is the provision of improved means for applying the adhesive fluid to the pipe, so that waste in the application thereof is prevented.

Further objects of the invention include the provision of a pipe wrapping machine which receives its driving torque from an external source such as a service car traveling alongside the pipe line; and which is a flexible unit of light weight and simple construction.

The invention possesses numerous other objects and features of advantage, some of which, with the foregoing, will be set forth in the following description of my invention. It is to be understood that I do not limit myself to this disclosure of species of my invention, as I may adapt variant embodiments thereof within the scope of the claims.

Referring to the drawings.

Figure 1:
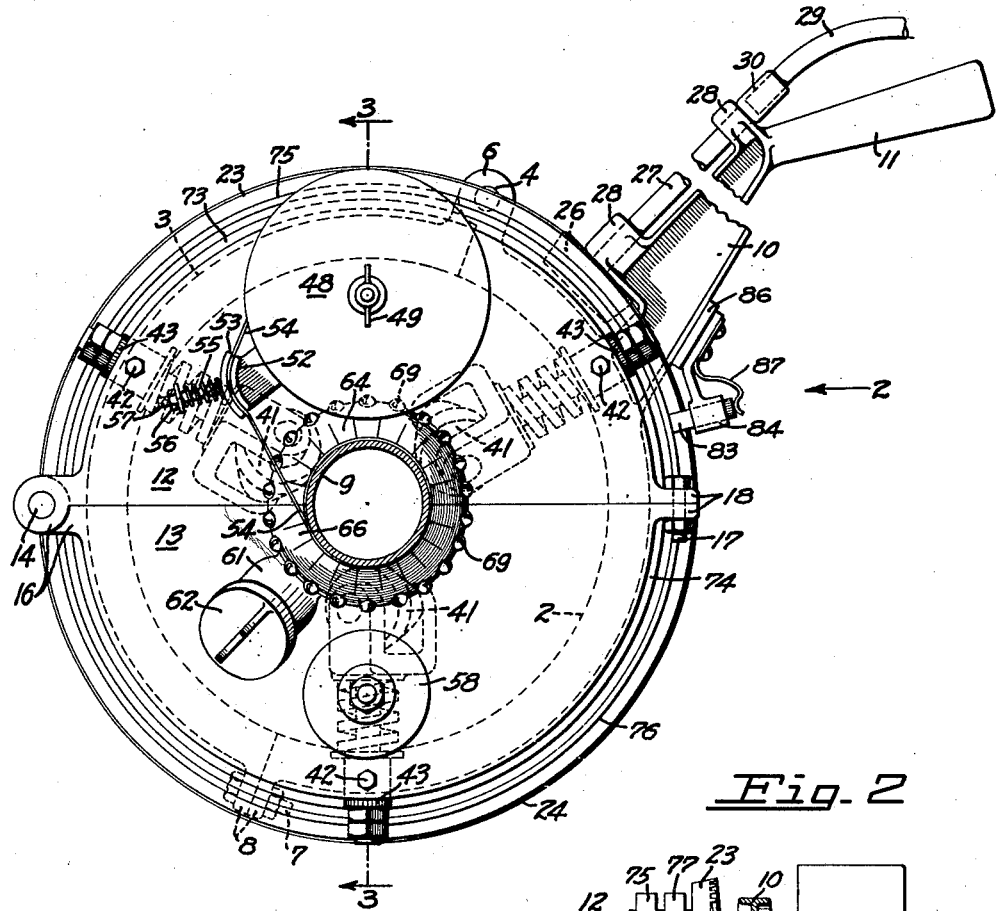
Figure 1 is an end elevation of the pipe wrapping machine embodying my invention taken in the direction of arrow 1 of Figure 3.
Figure 2:
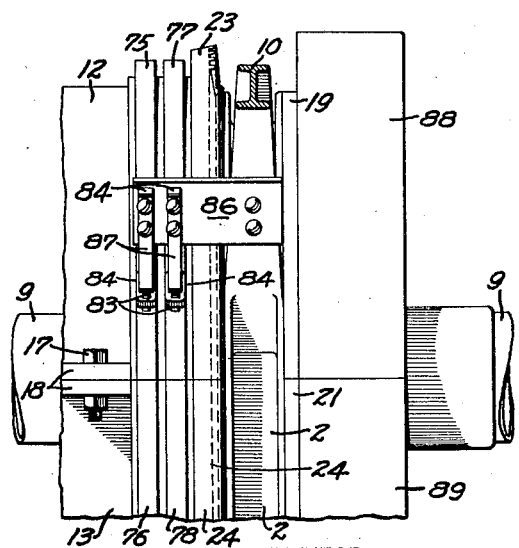
Figure 2 is a fragmentary side elevational view of the pipe wrapping machine taken in the direction of arrow 2 of Figure 1.
Figure 3:
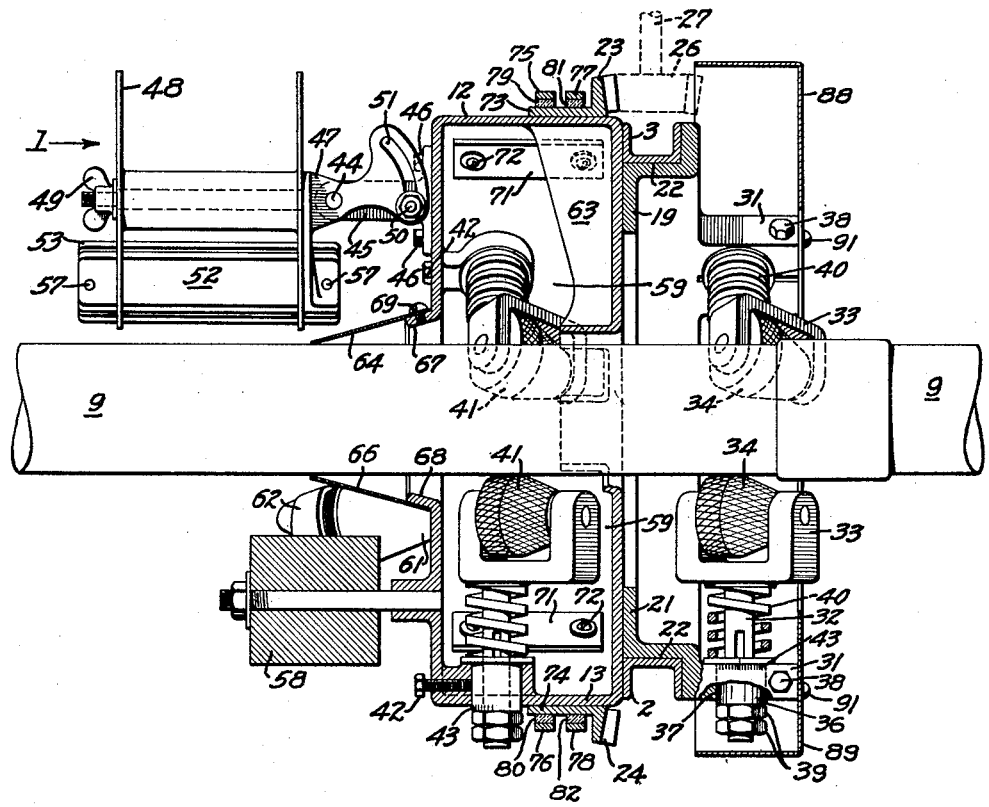
Figure 3 is a longitudinal vertical sectional view of the pipe wrapping machine taken in a plane indicated by line 3—3 of Figure 1.

In terms of broad inclusion, the pipe wrapping machine embodying my invention comprises a frame having a rotor adapted to surround the pipe to be wrapped. The rotor is preferably driven by a torque received from an external source, and has connected therewith means for advancing the frame along the pipe; hence, the rotor has a combined rotational and longitudinal movement. Means are provided for applying a helical winding on the pipe; and means are provided for applying an adhesive fluid to the pipe prior to the application of the winding thereon. Also, means are provided for heating the fluid; and means are provided for distributing the fluid evenly about the pipe and conserving any excess amount thereof.

In greater detail the pipe wrapping machine embodying my invention is carried by a frame or supporting ring comprising the semicircular portions 2 and 3, hinged at one end by a pin 4 through the hinge portions 6, and secured together at the other end by a bolt 7 through the abutting flanges 8; hence, the ring may be positioned around an installed pipe line 9 at any point. The portion 2 is provided with a radially extending and outwardly projecting I-shaped lever arm 10, terminating in the downturned handle 11. During the operation of the machine an attendant preferably walks alongside the pipe, and by holding to the handle 11 prevents rotation of the frame or supporting ring.

Removably mounted for rotation in the supporting ring is a recessed annular rotor comprising the semicircular portions 12 and 13, hinged at one end by a pin 14 through the hinge portions 16, and secured together at the other end by a bolt 17 through the abutting flanges 18; hence, the head may also be positioned around the pipe line at any point. The rotor is held rotatable in the supporting ring by the semicircular Z-shaped members 19 and 21, fixed to the head portions so that an annular groove 22 is formed therebetween into which the supporting ring is adapted to slidably engage.

Means are provided for rotating the rotor relative to the supporting ring. Mounted in fixed position on the rotor portions 12 and 13 are the semicircular beveled gear segments 23 and 24, adapted to form a substantially continuous annular gear when the rotor portions are closed. Meshed with this gear is a driving pinion 26 fixed for rotation on the end of a shaft 27 which is journaled in suitable bearings 28 on the lever arm 10. The shaft 27 is preferably driven from some external source, such as a service car traveling alongside the pipe line, by means of a flexible cable 29. The cable is preferably made detachable where it connects with shaft 27 by a suitable coupling 30.

Means are provided for supporting the machine on the pipe 9, so that when the rotor is rotated the machine will be advanced therealong, and is preferably effected by a plurality of spring pressed feed rollers mounted on the rotor. Radially mounted in the split lugs 31, which project axially outward from the Z-shaped members 19 and 21, are the adjustable roller supporting shanks 32. Formed on the inwardly projecting ends of these shanks are the yokes 33 into the arms of which are journaled the partially beveled feed rollers 34. The shanks 32 are slidably splined in the collars 36, which in turn are adjustably seated in the apertures 37 formed in the split lugs 31; and the locking screws 38, threaded in the split lugs 31 adapted to bear against the collars 36, allow the rollers to be locked angularly in a preselected position. The lock nuts 39, threaded on the outer ends of shanks 33, adjustably limit the radial positions of the rollers; and the springs 40, surrounding the shanks and positioned between the split lugs and the roller yokes, cause the rollers to be resiliently thrust against the periphery of the pipe.

From the above construction it is seen that the rollers may be set angularly and radially. The angular setting determines the rate of advance of the machine along the pipe, and the radial adjustment accommodates the machine to be used with various sizes of pipes within the limits of its capacity. It is to be noted that the forward portions of the rollers are beveled to assist them in climbing over couplings and the like; there being preferably three of these rollers equally spaced about the axis of the machine.

Mounted on the rotor, and preferably within the recess thereof, is a second set of spring pressed feed rollers 41, similar to the above mentioned rollers. They are identical in construction with those first mentioned, and their angular setting is maintained by the set screws 42 threaded in the rotor portions. Both sets of rollers are provided with a scale 43 and are calibrated in a like manner so that the same corresponding relative settings may be made; thus causing each roller to feed the machine along the pipe at the same rate.

Wrapping means is provided on the rotor for applying a helical wrapping to the pipe line. Adjustably mounted for pivotal movement by a pin 44 on the bracket 45, secured to the rotor portion 12 by screws 46, is a reel mounting 47 adapted to carry journaled thereon the strip material containing reel 48. Removal of reel 48 is facilitated by a wing nut 49 which holds the reel on the mounting. Adjustment of the reel is effected by a locking screw 50 threaded in the bracket 45, and engaging an arcuate slot 51 formed in a segment portion of the reel mounting 47. Secured to the reel mounting is a spring pressed tension device comprising a fixed curved portion 52 formed on the reel mounting, and a loose curved portion 53 adapted to bear on a strip of wrapping material 54 passing between the portions. The pressure on the strip material passing through the tension device is varied according to the tension placed on the springs 55; the spring tension being controlled by adjusting nuts 56 threaded on the guide pins 57.

It is obvious, that, by varying the adjustment of reel 48, the winding pitch can be made to accord with the various pitches that might be given to the applied wrapping strip, depending on the angular settings of the feed rollers. A counter weight 58 mounted on the head diametrically opposite the reel mounting, provides a means for balancing the weight of the reel and insures smooth operation of the machine.

Means is provided for applying an adhesive fluid to the pipe prior to the application of the wrapping thereon; the annular recess 59 in the rotor portions serving as a reservoir for the fluid. An apertured neck 61, provided on the side of portion 13 and communicating with recess 59, is normally covered by a cap 62 and provides a means for introducing the fluid. The rotor portions 12 and 13 are provided with the inwardly projecting fins 63 for carrying the fluid, which is normally held in the lower part of the reservoir due to gravity action, upward to deposit it on the upper surface of the pipe. Preferably there are three of these fins, each spaced between the feed rollers 41.

The fluid is evenly distributed about the pipe, and any excess amount returned to the reservoir, by suitable means cooperating with the rotor. A cone shaped wiper, preferably of split steel and comprising the semicircular portions 64 and 66 secured to the rotor flanges 67 and 68 by suitable screws 69, projects apex outwardly from the rotor. The wiper surrounds the pipe and is spaced therefrom a distance which determines the amount of fluid to be left on the pipe, and the conical shape of the wiper directs any excess fluid back into the reservoir. The pipe to be covered will obviously determine the size of the wiper; wipers having various size openings being preferably provided to accommodate different sizes of pipes within the limits of the machine capacity.

The fluid is preferably heated prior to its application on the pipe by means of the electrical heating elements 71 secured within the rotor by screws 72; preferably there are three of these heating elements in the rotor, arranged between the fins 63. Mounted on the periphery of the rotor portions, on the hub portions 73 and 74 of the gear segments 23 and 24, are a pair of spaced commutator rings comprising the semicircular segments 75 and 76 and the similar segments 77 and 78; hence, when the rotor portions are closed the commutator segments form a pair of substantially continuous rings. The commutator segments are insulated from the rotor portions by the semicircular insulating segments 79 and 80 and similar segments 81 and 82, mounted between the commutator segments and rotor portions.

The heating elements 71 are electrically connected to the commutator segments; and the brush elements 83, seated in the holders 84 which are mounted on arm 10 and insulated therefrom by insulator 86, are resiliently held in contact with the commutator rings by the springs 87. Suitable current, preferably supplied from an external source, such as the battery of the service car, is introduced into the brushes and hence is conducted by the commutator rings to the heating elements.

A guard for protecting the machine against dust is preferably provided, and comprises the semicircular L-shaped portions 88 and 89, secured to the forward end of the machine on the lugs 31 by suitable screws 91.

In the operation of the machine, the supporting ring portions are opened and the rotor removed so that it may be opened and placed about the pipe line where wrapping is to begin. The rotor portions are then secured together and the supporting ring superimposed about the pipe and secured in its journaled position on the rotor. The feed rollers are next adjusted relative to the pipe and set for proper advance therealong.

A reel of wrapping material is placed on the reel mounting and the material guided through the tension device and secured to the pipe in any suitable manner. The angular adjustment of the reel depends upon the pitch of the wrapping strip being wound on the pipe, and is set accordingly. The tension device obviously determines the tightness of the wrapping. Adhesive fluid is introduced into the rotor and current applied to the heating elements to heat the fluid. Preliminary operations are now completed and the machine is ready for operation.

An operator walks alongside the pipe line carrying handle 11 to prevent rotation of the frame or supporting ring, and the rotor is rotated by the flexible torque conductor driven by a service car following the wrapping machine. As the rotor rotates, it is advanced along the pipe line and applies heated fluid thereon followed by a helical wrapping.

I claim:

1. A pipe wrapping machine comprising a frame, a rotor journaled on the frame and adapted to surround the pipe to be wrapped, a plurality of adjustable spring pressed rollers on the rotor for advancing the machine along the pipe, the rear portions of said rollers being cylindrically shaped and the forward portions being conically shaped, and means for applying a helical winding to the pipe.

2. A pipe wrapping machine comprising a frame, a rotor journaled on the frame and adapted to surround the pipe to be wrapped, means on the rotor for advancing the machine along the pipe, means for applying a helical winding to the pipe, and means for applying a fluid to the pipe.

3. A pipe wrapping machine comprising a frame, a rotor journaled on the frame and adapted to surround the pipe to be wrapped, means on the rotor for advancing the machine along the pipe, means for applying a helical winding to the pipe, means on the rotor for containing an adhesive fluid, and means for applying the fluid to the pipe.

4. A pipe wrapping machine comprising a rotor adapted to surround the pipe to be wrapped, means on the rotor for containing an adhesive fluid and applying the fluid to the pipe, and electrical heating elements arranged in the rotor for heating the fluid.

5. A pipe wrapping machine comprising a frame, a rotor journaled on the frame and adapted to surround the pipe, feed rollers adapted to engage the pipe and mounted on the rotor for adjustment about an axis perpendicular to the axis of the pipe, means for rotating the rotor, and means associated with the rotor for applying fluid to the pipe.

6. A pipe wrapping machine comprising a frame, a rotor journaled on the frame and adapted to surround the pipe, feed rollers adapted to engage the pipe and mounted on the rotor for adjustment about an axis perpendicular to the axis of the pipe, means for rotating the rotor, means associated with the rotor for applying fluid to the pipe, and means for conserving any excess portion of the applied fluid.

7. A pipe wrapping machine comprising a frame, a rotor journaled on the frame and adapted to surround the pipe, feed rollers adapted to engage the pipe and mounted on the rotor for adjustment about an axis perpendicular to the axis of the pipe, means for rotating the rotor, means associated with the rotor for applying fluid to the pipe, and means for spreading the fluid evenly about the pipe and conserving any excess portions thereof.

8. A pipe wrapping machine comprising a rotor adapted to surround the pipe to be wrapped, a plurality of rollers mounted on said rotor and adapted to contact with said pipe, the axes of said rollers being set at an angle with respect to the axis of the pipe so that rotation of the rotor effects longitudinal movement along the pipe as a track, means for mounting a roll of sheet wrapping material for movement with said rotor, and means for applying a fluid to bind the wrapping material to the pipe.

9. A pipe wrapping machine comprising a rotor adapted to surround the pipe, and a spring pressed roller on the rotor for engaging the pipe and set with its axis at an angle with respect to the pipe axis for feeding the rotor along the pipe, said feed roller having its leading edge conically shaped to provide a smooth beveled edge surface to assist the same in climbing over obstructions on the pipe.

10. A pipe wrapping machine comprising a rotor adapted to surround the pipe, and a plurality of spring pressed rollers on the rotor and spaced circumferentially about the pipe for engaging the latter, said rollers being set with their axes at an angle with respect to the pipe axis for feeding the rotor along the pipe and having their leading edges conically shaped to provide smooth beveled edge surfaces to assist the same in climbing over obstructions on the pipe.

11. A pipe wrapping machine comprising a rotor adapted to surround the pipe, means on the rotor for advancing the machine along the pipe, means for applying a helical winding to the pipe, and means for applying a fluid to the pipe.

DOZIER FINLEY.